(12) United States Patent
Hu

(10) Patent No.: US 8,213,783 B2
(45) Date of Patent: Jul. 3, 2012

(54) ANTI-SHAKE DEVICE AND OPTICAL SYSTEM HAVING THE SAME

(75) Inventor: Chao Chang Hu, Taoyuan County (TW)

(73) Assignee: TDK Taiwan Corp. (TW)

( * ) Notice: Subject to any disclaimer, the term of this patent is extended or adjusted under 35 U.S.C. 154(b) by 0 days.

(21) Appl. No.: 12/927,629

(22) Filed: Nov. 18, 2010

(65) Prior Publication Data

US 2012/0128339 A1    May 24, 2012

(51) Int. Cl.
 *G03B 17/00*  (2006.01)
 *H04N 5/228*  (2006.01)
(52) U.S. Cl. .......................... 396/55; 348/208.8
(58) Field of Classification Search .............. 396/55; 348/208.8

See application file for complete search history.

(56) References Cited

U.S. PATENT DOCUMENTS

| | | | | |
|---|---|---|---|---|
| 5,041,852 A * | 8/1991 | Misawa et al. | ................... | 396/55 |
| 5,822,122 A * | 10/1998 | Kuno et al. | .................... | 359/557 |
| 7,375,905 B2 * | 5/2008 | Jin | .............................. | 359/726 |
| 7,561,185 B2 * | 7/2009 | Yamasaki et al. | ........ | 348/208.99 |
| 2007/0035631 A1* | 2/2007 | Ueda | ........................ | 348/208.99 |
| 2010/0080545 A1* | 4/2010 | Fan et al. | ......................... | 396/55 |
| 2011/0150442 A1* | 6/2011 | Ollila et al. | ..................... | 396/55 |
| 2011/0262122 A1* | 10/2011 | Minamisawa et al. | .......... | 396/55 |

* cited by examiner

*Primary Examiner* — Rodney Fuller

(57) ABSTRACT

An anti-shake device for use in an optical system comprises a biaxial rotating element and a electromagnetic driving module. The biaxial rotating element is made by grooving a thin resilient plate to form a special multiple-frame structure. The biaxial rotating element, when driven by the electromagnetic driving module, makes limited pivotal movement about two axes so as to provide shake compensation. The electromagnetic driving module, composed of a plurality of permanent magnets and a plurality of coils, is supported and positioned by an inner support frame and an outer support frame, both of which have uniquely designed structures. The resultant anti-shake device is structurally simple, easy to assemble, compact in size, and relatively low-cost.

8 Claims, 5 Drawing Sheets

ANTI-SHAKE DEVICE AND OPTICAL SYSTEM HAVING THE SAME

BACKGROUND OF INVENTION

1. Field of the Invention

The present invention relates to an anti-shake device for use in an optical system. More particularly, the present invention relates to an anti-shake device and an optical system using the same, wherein the anti-shake device includes a biaxial rotating element which is formed of a thin resilient plate and driven by an electromagnetic driving module to pivot about two different axes and thereby compensate for the unstable state of the optical path of the optical system while the optical system is shaken.

2. Description of the Prior Art

In an optical system composed of an optical lens set and an image capture module, such as a camera for taking still and/or moving images, the optical path is very likely to be shaken or shifted by an external force or by the shaking of hands holding the camera. Once the optical path is shaken, the image capture module is unable to form images stably, and the images thus taken are blurred. The most common solution is to provide a compensation mechanism, digital or optical, for restoring clarity to the blurred images caused by shaking. A digital compensation mechanism, also known as a digital anti-shake mechanism, involves analyzing and processing the digital image data captured by the image capture module so as to obtain relatively clear digital images. An optical compensation mechanism, on the other hand, relies on a shake compensation device provided on either the optical lens set or the image capture module and is also known as an optical anti-shake mechanism. The shake compensation device detects the amounts by which the optical elements in the optical lens set are shifted during the shaking process and, by means of a driving device, adjusts the optical path to the optimal state, thus preventing the shaking from blurring the images taken.

However, the existing optical anti-shake mechanisms typically require complicated or bulky structures or elements and therefore leave much room for improvement, particularly in terms of technical complexity, the difficulty of assembly, cost, and volume.

SUMMARY OF INVENTION

The first object of the present invention is to provide an anti-shake device to be installed in an optical system, wherein a biaxial rotating element having a special multiple-frame structure is formed by making grooves in a thin resilient plate and is driven by a driving module to pivot about two axes to a limited extent. Thus, the anti-shake device features a simple structure, is easy to assemble, has a small volume, and incurs low cost.

The second object of the present invention is to provide an anti-shake device for use in an optical system, wherein an electromagnetic driving device composed of permanent magnets and coils drives a biaxial rotating element to pivot about two axes to a limited extent, and wherein the permanent magnets and the coils are mounted on and positioned by structurally unique inner and outer support frames. Thus, the anti-shake device features a simple structure, is easy to assemble, has a small volume, and incurs low cost.

In order to achieve aforementioned objects, the present invention discloses an anti-shake device which is provided in an optical system defining an optical path. The anti-shake device comprises:

a biaxial rotating element provided in the optical path and configured to be pivoted at least about a first axis and a second axis to a limited extent, the biaxial rotating element being a thin resilient plate comprising:

an inner plate portion having a flat surface facing the optical path, the flat surface defining the first axis and the second axis;

a middle frame portion surrounding the inner plate portion, there being at least a first through groove provided between the middle frame portion and the inner plate portion and encircling the inner plate portion, there being two first connecting portions provided between the middle frame portion and the inner plate portion and aligned along the first axis, the inner plate portion being connected to the middle frame portion by the two first connecting portions; and an outer frame portion surrounding the middle frame portion, there being at least a second through groove provided between the outer frame portion and the middle frame portion and encircling the middle frame portion, there being two second connecting portions provided between the outer frame portion and the middle frame portion and aligned along the second axis, the middle frame portion being connected to the outer frame portion by the two second connecting portions; and a driving module connected to the biaxial rotating element so as to drive the biaxial rotating element to pivot about the first axis and the second axis to the limited extent, wherein the driving module is configured to drive the inner plate portion to pivot about the first axis and the second axis with respect to the outer frame portion.

In a preferred embodiment, the driving module is an electromagnetic driving module and comprises:

an inner support frame connected to and movable with the inner plate portion;

an outer support frame connected to the outer frame portion and being immovable;

at least a first magnet and at least a second magnet, wherein one of the at least a first magnet and the at least a first coil is provided on the inner support frame, and the other of the at least a first magnet and the at least a first coil is provided on the outer support frame, wherein by supplying electricity to the at least a first coil, an electromagnetic force is generated to drive the inner support frame, along with the inner plate portion, to pivot about the first axis; and at least a second magnet and at least a second coil, wherein one of the at least a second magnet and the at least a second coil is provided on the inner support frame, and the other of the at least a second magnet and the at least a second coil is provided on the outer support frame, wherein by supplying electricity to the at least a second coil, an electromagnetic force is generated to drive the inner support frame, along with the inner plate portion, to pivot about the second axis.

In a preferred embodiment, wherein:

the inner support frame is a wedge-shaped frame structure and has a rectangular first contact portion and four first lateral sides, the rectangular first contact portion being connected to the inner plate portion, the four first lateral sides extending respectively from four sides of the rectangular first contact portion toward a direction away from the inner plate portion, two said first lateral sides having corresponding right-angled triangular shapes and being parallel to each other, the other two first lateral sides being rectangular and connected perpendicularly to each other, each said first lateral side being provided with a first receiving seat;

the outer support frame is a wedge-shaped frame structure and has a rectangular second contact portion and four second lateral sides, the rectangular second contact portion being connected to the outer frame portion, the four second lateral sides extending respectively from four sides of the rectangular second contact portion toward a direction away from the outer frame portion, two said second lateral sides having corresponding right-angled triangular shapes and being parallel to each other, the other two second lateral sides being rectangular and connected perpendicularly to each other, each said second lateral side being provided with a second receiving seat;

the at least a first magnet is provided in the first receiving seats on the triangular first lateral sides of the inner support frame while the at least a first coil is provided in the second receiving seats on the triangular second lateral sides of the outer support frame via first circuit boards; and the at least a second magnet is provided in the first receiving seats on the rectangular first lateral sides of the inner support frame while the at least a second coil is provided in the second receiving seats on the rectangular second lateral sides of the outer support frame via second circuit boards.

In a preferred embodiment, the optical system comprises an optical lens module and an image capture module which are both in the optical path, the anti-shake device further comprising:

a shake detection module provided on the optical lens module and configured to detect a shake amount of the optical lens module;

a position detection module provided on the driving module and configured to detect amounts by which the biaxial rotating element is pivoted about the first axis and the second axis;

an optical path adjusting element provided on the flat surface of the inner plate portion of the biaxial rotating element and configured to adjust a direction of light coming from the optical lens module so that the light is projected toward the image capture module; and a control module connected to the shake detection module, the position detection module, and the driving module and configured to control the driving module according to the shake amount of the optical lens module, detected by the shake detection module, and the amounts by which the biaxial rotating element is pivoted, detected by the position detection module, so that the driving module pivots the biaxial rotating element and thereby compensates for an unstable state of the optical path that is caused by shaking of the optical lens module.

In a preferred embodiment, the position detection module comprises a first magnetism sensing element centrally provided in each said first coil and corresponding in position to the first magnet corresponding to each said first coil, and a second magnetism sensing element centrally provided in each said second coil and corresponding in position to the second magnet corresponding to each said second coil, the first and the second magnetism sensing elements being configured to detect variation of magnetic lines so as for the control module to calculate the amounts by which the biaxial rotating element is pivoted; and wherein the optical path adjusting element is one of a wedge-shaped prism provided on the flat surface of the inner plate portion and a reflective layer provided on the flat surface of the inner plate portion.

BRIEF DESCRIPTION OF THE DRAWINGS

The structure as well as a preferred mode of use, further objects, and advantages of the present invention will be best understood by referring to the following detailed description of the preferred embodiments in conjunction with the accompanying drawings, in which.

DETAILED DESCRIPTION OF THE PREFERRED EMBODIMENT

The present invention provides an anti-shake device for use in an optical system, and the principle on which the anti-shake device works is stated as follows. A biaxial rotating element having a special multiple-frame structure is formed by grooving a thin resilient plate. The biaxial rotating element, when driven by an electromagnetic driving module, makes limited pivotal movement about two axes so as to provide shake compensation. The electromagnetic driving module, composed of a plurality of permanent magnets and a plurality of coils, is supported and positioned by an inner support frame and an outer support frame, both of which have uniquely designed structures. The resultant anti-shake device is structurally simple, easy to assemble, compact in size, and relatively low-cost.

Please refer to FIGS. 1 through 4 for a preferred embodiment of the disclosed anti-shake device for use in an optical system.

Figure 1:
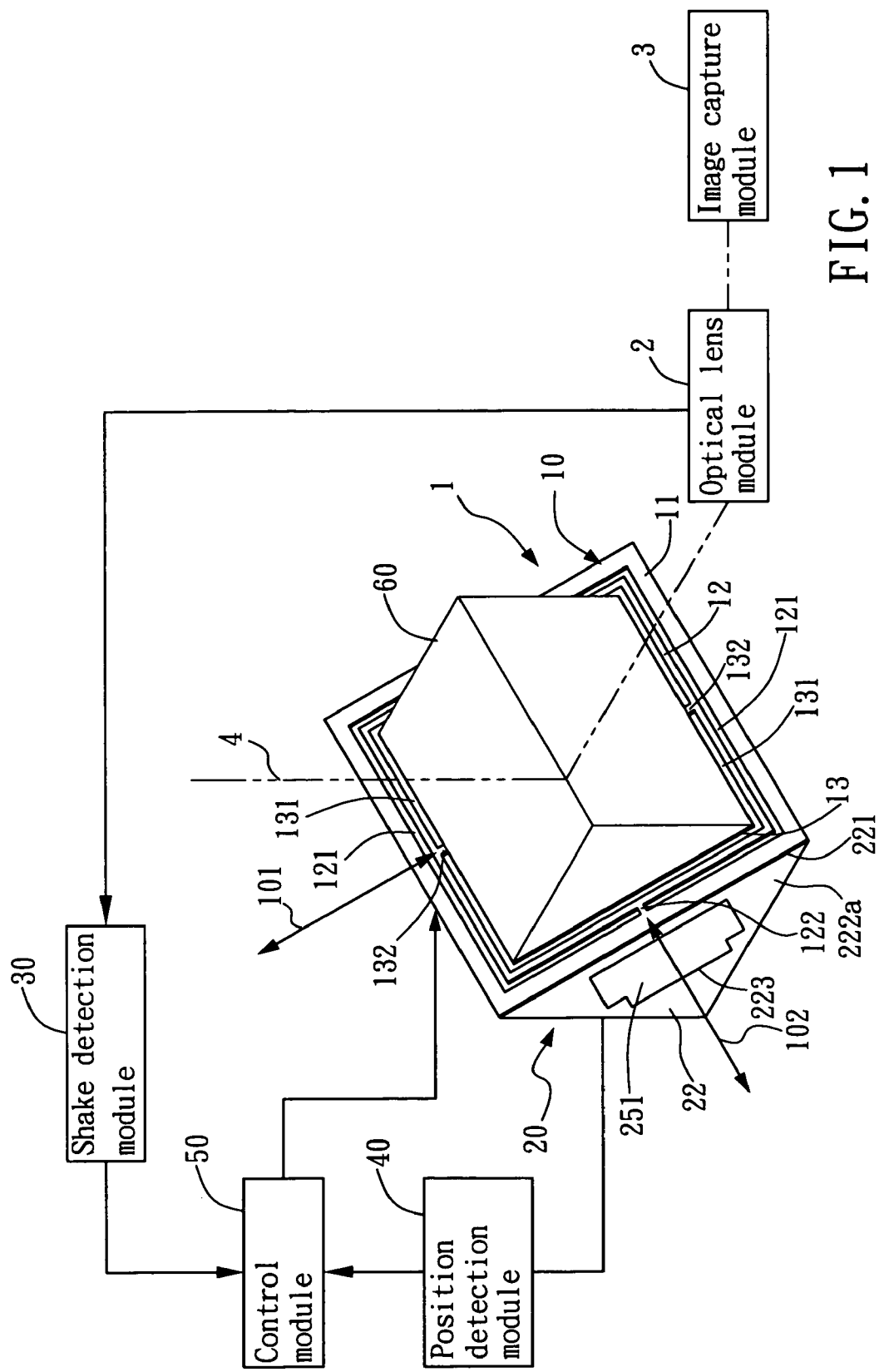
FIG. 1 provides a perspective view of an anti-shake device according to the present invention and schematically shows where the anti-shake device is installed in an optical system.

As shown in FIG. 1, an anti-shake device 1 according to the present invention is installed in an optical system, wherein the optical system includes an optical lens module 2 and an image capture module 3. The optical lens module 2 and the image capture module 3 define an optical path 4 along which the image light of an external object is converged and then forms an image on the image capture device 3. In the present embodiment, the optical lens module 2 is a fixed-focus or zoom lens module including a plurality of lenses, and the image capture module 3 is an image sensor composed of, for example, a charge-coupled device (CCD) or complementary metal-oxide-semiconductor (CMOS) photosensitive element. The optical lens module 2 transmits the image light of an external object along the optical path 4 so that an image of the external object is formed on the photosensitive element of the image capture module 3. The image capture module 3 then converts the optical image into computer-readable digital image data. Thus, the optical system functions as a digital still or video camera. As the optical lens module 2 and the image capture module 3 described above are commercially available prior art devices and do not constitute a major technical feature of the present invention, a detailed description of the structures of these two modules is omitted herein.

Preferably, as in the present embodiment, the anti-shake device 1 is disposed at the foremost end of the optical path 4 in the incident direction of an image light; that is, the anti-shake device 1 is forward of the optical lens module 2 and the image capture module 3 in a direction facing the external object to be imaged. Alternatively, the anti-shake device 1 is positioned between the optical lens module 2 and the image capture module 3.

Referring to FIG. 1 for a preferred embodiment of the anti-shake device 1, the anti-shake device 1 includes a biaxial rotating element 10, a driving module 20, a shake detection module 30, a position detection module 40, a control module 50, and an optical path adjusting element 60.

Figure 2A:
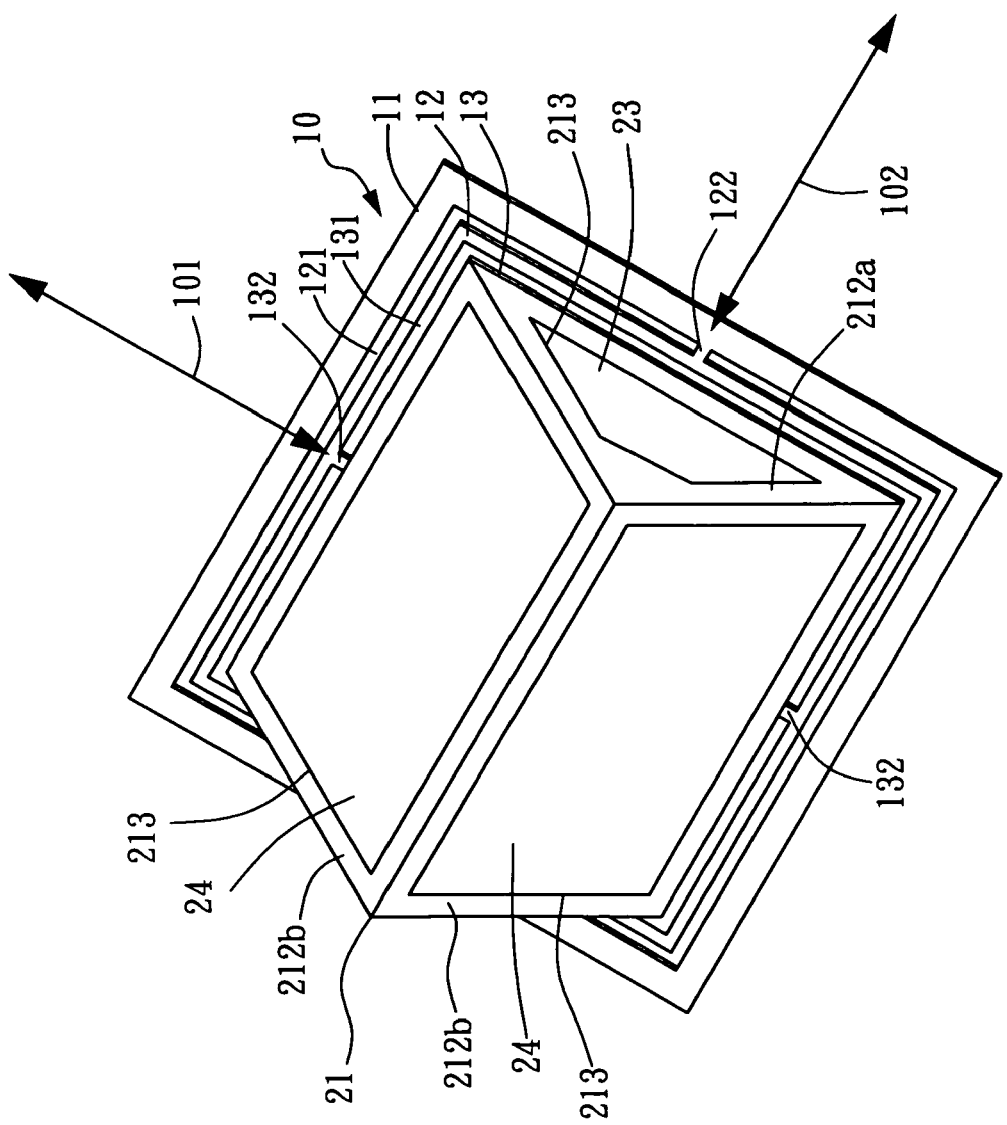
FIG. 2A is an assembled perspective bottom view of a biaxial rotating element, an inner support frame, and magnets in the anti-shake device of the present invention.
Figure 2B:
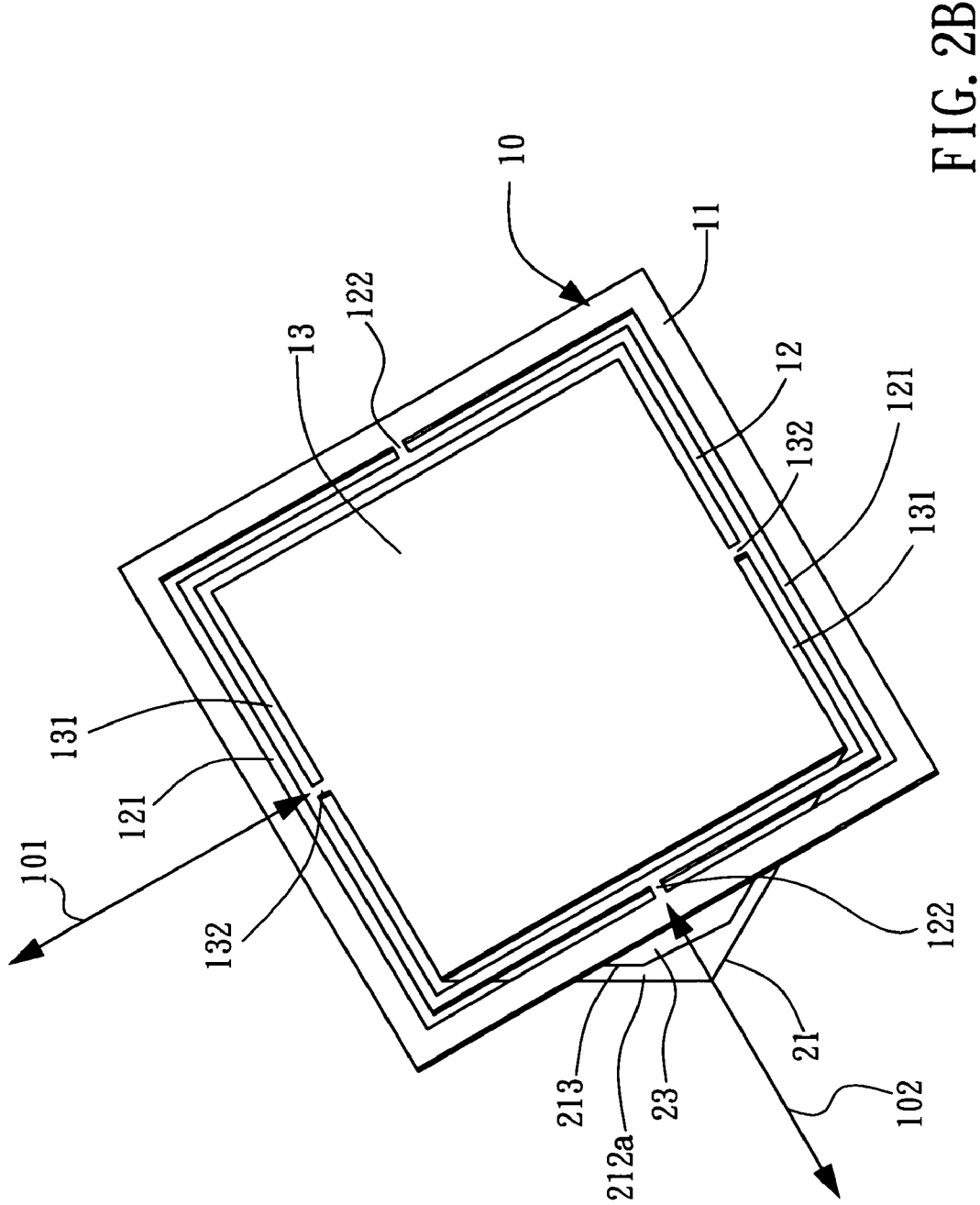
FIG. 2B is an assembled perspective top view of the biaxial rotating element, the inner support frame, and the magnets in the anti-shake device of the present invention.

The biaxial rotating element 10 is situated in the optical path 4 and is configured to pivot, to a limited extent, at least about a first axis 101 and a second axis 102 which are perpendicular to each other. As shown in FIG. 2, the biaxial rotating element 10 in the present embodiment is a thin rectangular resilient plate having four sides. The thin resilient plate includes an outer frame portion 11, a middle frame portion 12, and an inner plate portion 13. The inner plate portion 13 has a flat surface facing the optical path 4 and defining the first axis 101 and the second axis 102. The middle frame portion 12 surrounds the inner plate portion 13. Between the middle frame portion 12 and the inner plate portion 13 are at least one first through groove 131 encircling the inner plate portion 13, and two first connecting portions 132 aligned along the first axis 101. The two first connecting portions 132 are provided respectively on two opposite sides of the inner plate portion 13 and substantially divide the first through groove 131 into two square U-shaped first through grooves 131. The inner plate portion 13 is connected to the middle frame portion 12 by the two first connecting portions 132. Similarly, the outer frame portion 11 surrounds the middle frame portion 12. Between the outer frame portion 11 and the middle frame portion 12 are at least one second through groove 121 encircling the middle frame portion 12, and two second connecting portions 122 aligned along the second axis 102. The two second connecting portions 122 are provided respectively on two opposite sides of the middle frame portion 12 and substantially divide the second through groove 121 into two square U-shaped second through grooves 121. The middle frame portion 12 is connected to the outer frame portion 11 by the two second connecting portions 122. In other words, the two first connecting portions 132 and the two second connecting portions 122 are arranged in pairs on the four sides of the thin rectangular resilient plate. The elasticity of the thin resilient plate not only allows the inner plate portion 13 to pivot to a limited extent with respect to the outer frame portion 11 about a pivot axis defined by the two first connecting portions 132 (i.e., the first axis 101), but also allows the inner plate portion 13 to pivot to a limited extent with respect to the outer frame portion 11 about a pivot axis defined by the two second connecting portions 122 (i.e., the second axis 102), thus accomplishing the intended function of the biaxial rotating element 10. The special multiple-frame design described above is formed by grooving the thin resilient plate and provides the biaxial rotating element 10 with a simple, compact, and low-cost structure that need not be assembled.

As shown in FIGS. 1 to 4, the driving module 20 is connected to the biaxial rotating element 10 and is configured to drive the biaxial rotating element 10 into limited pivotal movement about the first axis 101 and the second axis 102. In the present embodiment, the driving module 20 is an electromagnetic driving module at least including an inner support frame 21, an outer support frame 22, at least one first magnet 23, at least one second magnet 24, at least one first coil 25, and at least one second coil 26.

The inner support frame 21 is connected to the bottom surface of the inner plate portion 13 and is movable along with the inner plate portion 13. The outer support frame 22 is connected to the bottom surface of the outer frame portion 11 and is an immovable element.

Either the first magnets 23 or the first coils 25 are provided on the inner support frame 21, and the other of the first magnets 23 and the first coils 25 is provided on the outer support frame 22. In the present embodiment, the two lateral sides of the inner support frame 21 that are respectively adjacent to the two second connecting portions 122 are each provided with one first magnet 23, and the two lateral sides of the outer support frame 22 that are respectively adjacent to the two second connecting portions 122 are each provided with one first coil 25, wherein the two first coils 25 correspond in position to the two first magnets 23. By supplying an electric current to the two first coils 25, an electromagnetic force is generated to push the two first magnets 23 on the inner support frame 21; as a result, the inner plate portion 13 as well as the two first magnets 23 is driven into pivotal movement about the first axis 101.

Similarly, either the second magnets 24 or the second coils 26 are provided on the inner support frame 21, and the other of the second magnets 24 and the second coils 26 is provided on the outer support frame 22. In the present embodiment, the two lateral sides of the inner support frame 21 that are respectively adjacent to the two first connecting portions 132 are each provided with one second magnet 24, and the two lateral sides of the outer support frame 22 that are respectively adjacent to the two first connecting portions 132 are each provided with one second coil 26, wherein the two second coils 26 correspond in position to the two second magnets 24. By supplying an electric current to the second coils 26, an electromagnetic force is generated to push the two second magnets 24 on the inner support frame 21; as a result, the inner plate portion 13 as well as the two second magnets 24 is driven into pivotal movement about the second axis 102.

The inner support frame 21 is a wedge-shaped frame structure and has a rectangular first contact portion 211 and four first lateral sides 212a, 212b. The rectangular first contact portion 211 is connected to the bottom surface of the inner plate portion 13 while the four first lateral sides 212a, 212b extend respectively from the four sides of the rectangular first contact portion 211 toward a direction away from the inner plate portion 13. Of the four first lateral sides, the two lateral sides 212a are of corresponding right-angled triangle shapes and parallel to each other, and the other two lateral sides 212b are rectangular and connected perpendicularly to each other. In addition, each of the four first lateral sides 212a, 212b is provided with a first receiving seat 213. Similarly, the outer support frame 22 is a wedge-shaped frame structure and has a rectangular second contact portion 221 and four second lateral sides 222a, 222b. The rectangular second contact portion 221 is connected to the bottom surface of the outer frame portion 11 while the four second lateral sides 222a, 222b extend respectively from the four sides of the rectangular second contact portion 221 toward a direction away from the outer frame portion 11. Of the four second lateral sides 222a, 222b, the two lateral sides 222a are of corresponding right-angled triangle shapes and parallel to each other, and the other two lateral sides 222b are rectangular and connected perpendicularly to each other. In addition, each of the four second lateral sides 222a, 222b is provided with a second receiving seat 223. In the present embodiment, the first magnets 23 are provided in the first receiving seats 213 on the triangular first lateral sides 212a of the inner support frame 21 respectively, and the first coils 25 are provided, by means of first circuit boards 251, in the second receiving seats 223 on the triangular second lateral sides 222a of the outer support frame 22 respectively. Similarly, the second magnets 24 are provided in the first receiving seats 213 on the rectangular first lateral sides 212b of the inner support frame 21 respectively, and the second coils 26 are provided, by means of second circuit boards 261, in the second receiving seats 223 on the rectangular second lateral sides 222b of the outer support frame 22 respectively. The unique wedge-shaped inner and outer support frames 21, 22 are characterized by their right-angled lateral sides and serve to support and position the permanent magnets 23, 24 and the coils 25, 26 so that the resultant assembly can be easily accommodated in an optical system such as a digital still or video camera. Hence, the anti-shake device 1 features structural simplicity, easy assembly, small volume, and low cost.

The shake detection module 30, provided on the optical lens module 2, is configured to detect the shake amount of the optical lens module 2, or more specifically the amounts by which the optical lens module 2, when shaken, is shifted in two axial directions that are perpendicular to the optical path 4. Since the shake detection module 30 is a commercially available prior art device and does not constitute a major technical feature of the present invention, a detailed structural description of the shake detection module 30 is omitted herein.

Figure 4:
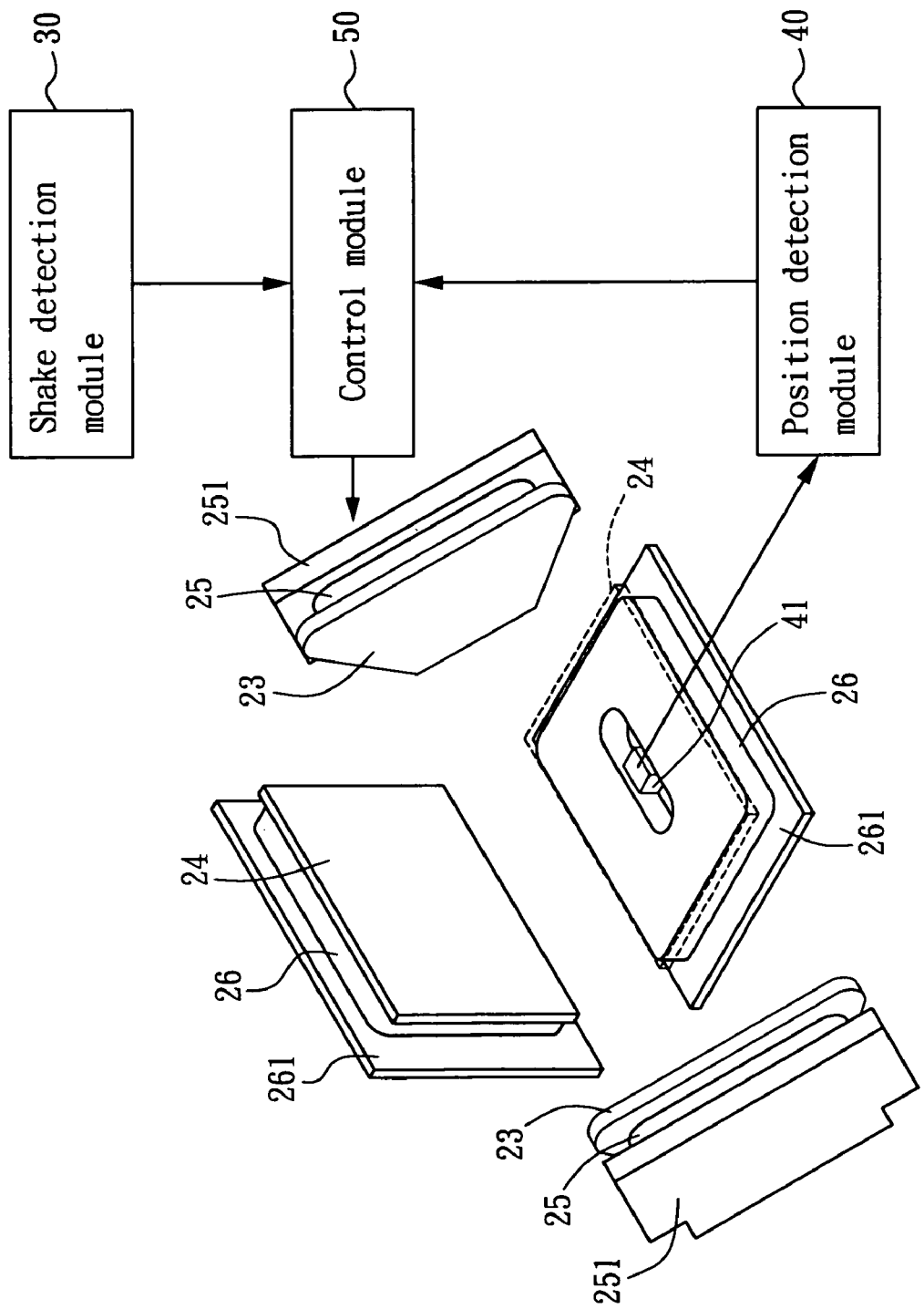
FIG. 4 schematically shows the relative positions of the magnets, coils, circuit boards, and magnetism sensing elements in the anti-shake device of the present invention.

The position detection module 40 is provided on the driving module 20 and is used to detect the amounts by which the biaxial rotating element 10 is pivoted about the first axis 101 and the second axis 102. With reference to FIG. 4, the position detection module 40 includes a first magnetism sensing element (not shown) provided at the center of each first coil 25 and corresponding in position to the first magnet 23 corresponding to each said first coil 25, and a second magnetism sensing element 41 provided at the center of each second coil 26 and corresponding in position to the second magnet 24 corresponding to each said second coil 26. The first and the second magnetism sensing elements 41 are configured to detect the variation of magnetic lines so as for the control module 50 to calculate the amounts by which the biaxial rotating element 10 is pivoted.

Figure 3:
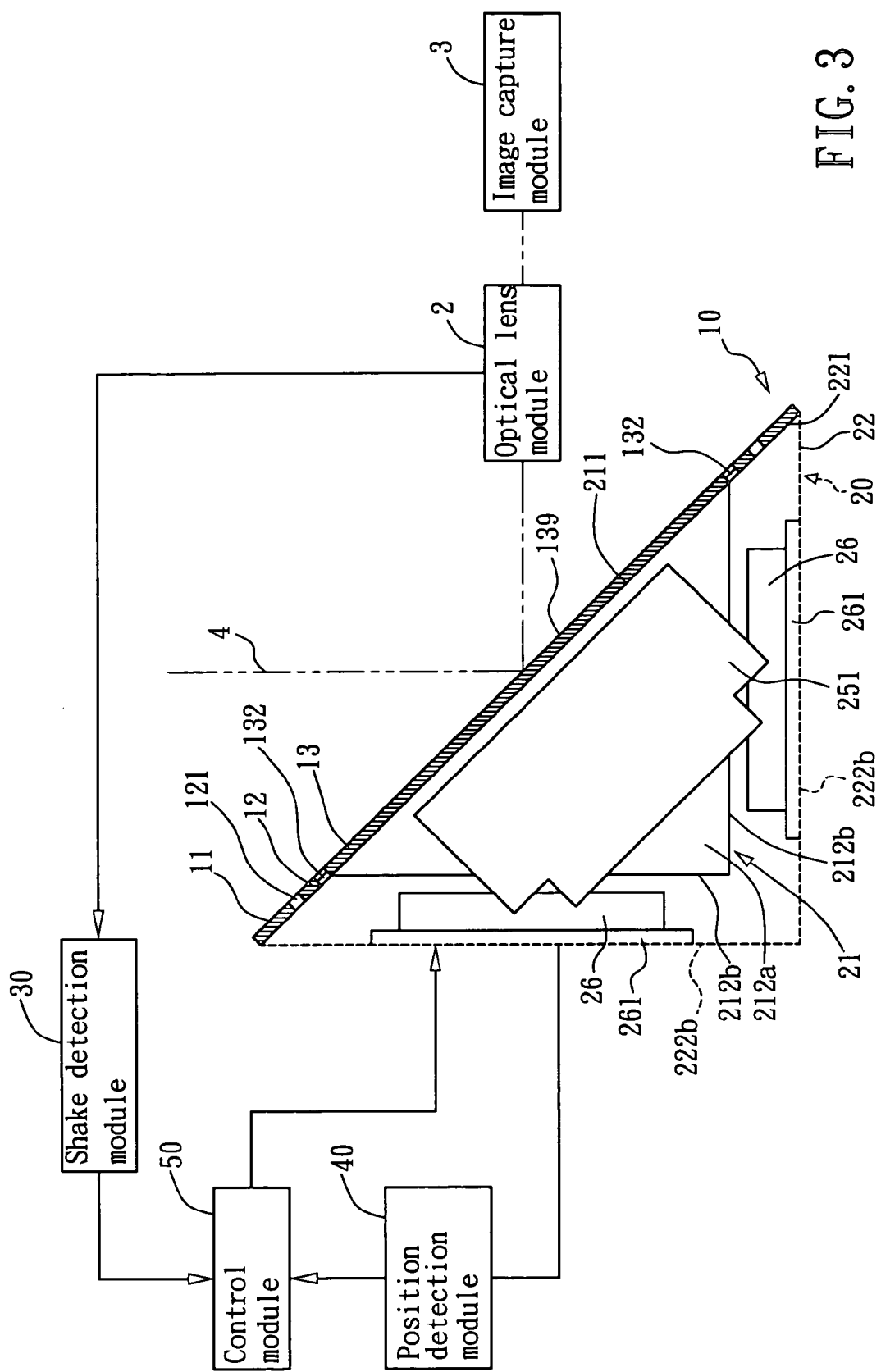
FIG. 3 is a see-through side view of the anti-shake device according to the present invention when installed in an optical system.

The optical path adjusting element 60 is provided on the flat surface of the inner plate portion 13 of the biaxial rotating element 10 and is configured to adjust the direction of light traveling along the optical path 4 so that the light is projected toward the image capture module 3. In the embodiment shown in FIG. 1, the optical path adjusting element 60 is a wedge-shaped prism located on the flat surface of the inner plate portion 13. The wedge-shaped prism can change the direction of an image light coming along the optical path 4 from above by 90 degrees so that the image light is projected to the optical lens module 2 and the image capture module 3 on the right. Alternatively, in another embodiment of the present invention as shown in FIG. 3, the optical path adjusting element 60 is a reflective layer 139 directly coated on the flat surface of the inner plate portion 13. The reflective layer 139 can change the direction of an image light coming along the optical path 4 from above by 90 degrees so that the image light is projected to the optical lens module 2 and the image capture module 3 on the right. In either embodiment, the function of optical path adjustment is achieved.

The control module 50 is connected to the shake detection module 30, the position detection module 40, and the driving module 20 so as to control the driving module 20 according to the shake amount of the optical lens module 2 (detected by the shake detection module 30) and the amounts by which the biaxial rotating element 10 is pivoted (detected by the position detection module 40), thereby instructing the driving module 20 to drive the biaxial rotating element 10 into pivotal movement, with a view to compensating for the unstable state of the optical path 4 while the optical lens module 2 is shaken. As the control module 50 is a commercially available prior art device and does not constitute a major technical feature of the present invention, a detailed structural description of the control module 50 is omitted herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An anti-shake device, provided in an optical system defining an optical path, the anti-shake device comprising:
   a biaxial rotating element provided in the optical path and configured to be pivoted at least about a first axis and a second axis to a limited extent, the biaxial rotating element being a thin resilient plate comprising:
   an inner plate portion having a flat surface facing the optical path, the flat surface defining the first axis and the second axis;
   a middle frame portion surrounding the inner plate portion, there being at least a first through groove provided between the middle frame portion and the inner plate portion and encircling the inner plate portion, there being two first connecting portions provided between the middle frame portion and the inner plate portion and aligned along the first axis, the inner plate portion being connected to the middle frame portion by the two first connecting portions; and
   an outer frame portion surrounding the middle frame portion, there being at least a second through groove provided between the outer frame portion and the middle frame portion and encircling the middle frame portion, there being two second connecting portions provided between the outer frame portion and the middle frame portion and aligned along the second axis, the middle frame portion being connected to the outer frame portion by the two second connecting portions;
   a driving module connected to the biaxial rotating element so as to drive the biaxial rotating element to pivot about the first axis and the second axis to the limited extent, wherein the driving module is configured to drive the inner plate portion to pivot about the first axis and the second axis with respect to the outer frame portion; and wherein the driving module is an electromagnetic driving module and comprises:
   an inner support frame connected to and movable with the inner plate portion;
   an outer support frame connected to the outer frame portion and being immovable;
   at least a first magnet and at least a second magnet, wherein one of the at least a first magnet and the at least a first coil is provided on the inner support frame, and the other of the at least a first magnet and the at least a first coil is provided on the outer support frame, wherein by supplying electricity to the at least a first coil, an electromagnetic force is generated to drive the inner support frame, along with the inner plate portion, to pivot about the first axis; and
   at least a second magnet and at least a second coil, wherein one of the at least a second magnet and the at least a second coil is provided on the inner support frame, and the other of the at least a second magnet and the at least a second coil is provided on the outer support frame, wherein by supplying electricity to the at least a second coil, an electromagnetic force is generated to drive the inner support frame, along with the inner plate portion, to pivot about the second axis.

2. The anti-shake device of claim 1, wherein:

the inner support frame is a wedge-shaped frame structure and has a rectangular first contact portion and four first lateral sides, the rectangular first contact portion being connected to the inner plate portion, the four first lateral sides extending respectively from four sides of the rectangular first contact portion toward a direction away from the inner plate portion, two said first lateral sides having corresponding right-angled triangular shapes and being parallel to each other, the other two first lateral sides being rectangular and connected perpendicularly to each other, each said first lateral side being provided with a first receiving seat;

the outer support frame is a wedge-shaped frame structure and has a rectangular second contact portion and four second lateral sides, the rectangular second contact portion being connected to the outer frame portion, the four second lateral sides extending respectively from four sides of the rectangular second contact portion toward a direction away from the outer frame portion, two said second lateral sides having corresponding right-angled triangular shapes and being parallel to each other, the other two second lateral sides being rectangular and connected perpendicularly to each other, each said second lateral side being provided with a second receiving seat;

the at least a first magnet is provided in the first receiving seats on the triangular first lateral sides of the inner support frame while the at least a first coil is provided in the second receiving seats on the triangular second lateral sides of the outer support frame via first circuit boards; and the at least a second magnet is provided in the first receiving seats on the rectangular first lateral sides of the inner support frame while the at least a second coil is provided in the second receiving seats on the rectangular second lateral sides of the outer support frame via second circuit boards.

3. The anti-shake device of claim 1, wherein the optical system comprises an optical lens module and an image capture module which are both in the optical path, the anti-shake device further comprising:

a shake detection module provided on the optical lens module and configured to detect a shake amount of the optical lens module;

a position detection module provided on the driving module and configured to detect amounts by which the biaxial rotating element is pivoted about the first axis and the second axis;

an optical path adjusting element provided on the flat surface of the inner plate portion of the biaxial rotating element and configured to adjust a direction of light coming from the optical lens module so that the light is projected toward the image capture module; and a control module connected to the shake detection module, the position detection module, and the driving module and configured to control the driving module according to the shake amount of the optical lens module, detected by the shake detection module, and the amounts by which the biaxial rotating element is pivoted, detected by the position detection module, so that the driving module pivots the biaxial rotating element and thereby compensates for an unstable state of the optical path that is caused by shaking of the optical lens module.

4. The anti-shake device of claim 3, wherein the position detection module comprises a first magnetism sensing element centrally provided in each said first coil and corresponding in position to the first magnet corresponding to each said first coil, and a second magnetism sensing element centrally provided in each said second coil and corresponding in position to the second magnet corresponding to each said second coil, the first and the second magnetism sensing elements being configured to detect variation of magnetic lines so as for the control module to calculate the amounts by which the biaxial rotating element is pivoted; and wherein the optical path adjusting element is one of a wedge-shaped prism provided on the flat surface of the inner plate portion and a reflective layer provided on the flat surface of the inner plate portion.

5. An optical system having an anti-shake device, the optical system comprising:

an image capture module;

an optical lens module, wherein an optical path is defined between the optical lens module and the image capture module; and the anti-shake device provided in the optical path and comprising:

a biaxial rotating element provided in the optical path and configured to be pivoted at least about a first axis and a second axis to a limited extent; and a driving module connected to the biaxial rotating element so as to drive the biaxial rotating element to pivot about the first axis and the second axis to the limited extent, the driving module being an electromagnetic driving module and comprising:

an inner support frame and an outer support frame, wherein at least one of the inner support frame and the outer support frame is connected to the biaxial rotating element;

at least a first magnet and at least a first coil, wherein one of the at least a first magnet and the at least a first coil is provided on the inner support frame, and the other of the at least a first magnet and the at least a first coil is provided on the outer support frame, wherein by supplying electricity to the at least a first coil, an electromagnetic force is generated to drive the inner support frame to pivot about the first axis;

at least a second magnet and at least a second coil, wherein one of the at least a second magnet and the at least a second coil is provided on the inner support frame, and the other of the at least a second magnet and the at least a second coil is provided on the outer support frame, wherein by supplying electricity to the at least a second coil, an electromagnetic force is generated to drive the inner support frame to pivot about the second axis, and wherein the biaxial rotating element is a thin resilient plate comprising:

an inner plate portion having a flat surface facing the optical path, the flat surface defining the first axis and the second axis;

a middle frame portion surrounding the inner plate portion, there being at least a first through groove provided between the middle frame portion and the inner plate portion and encircling the inner plate portion, there being two first connecting portions provided between the middle frame portion and the inner plate portion and aligned along the first axis, the inner plate portion being connected to the middle frame portion by the two first connecting portions; and an outer frame portion surrounding the middle frame portion, there being at least a second through groove provided between the outer frame portion and the middle frame portion and encircling the middle frame portion, there being two second connecting portions provided between the outer frame portion and the middle frame portion and aligned along the second axis, the middle frame portion being connected to the outer frame portion by the two second connecting portions;

wherein the inner support frame is connected to and movable with the inner plate portion, and the outer support frame is connected to the outer frame portion and immovable.

6. The optical system of claim 5, wherein:

the inner support frame is a wedge-shaped frame structure and has a rectangular first contact portion and four first lateral sides, the rectangular first contact portion being connected to the inner plate portion, the four first lateral sides extending respectively from four sides of the rectangular first contact portion toward a direction away from the inner plate portion, two said first lateral sides having corresponding right-angled triangular shapes and being parallel to each other, the other two first lateral sides being rectangular and connected perpendicularly to each other, each said first lateral side being provided with a first receiving seat;

the outer support frame is a wedge-shaped frame structure and has a rectangular second contact portion and four second lateral sides, the rectangular second contact portion being connected to the outer frame portion, the four second lateral sides extending respectively from four sides of the rectangular second contact portion toward a direction away from the outer frame portion, two said second lateral sides having corresponding right-angled triangular shapes and being parallel to each other, the other two second lateral sides being rectangular and connected perpendicularly to each other, each said second lateral side being provided with a second receiving seat;

the at least a first magnet is provided in the first receiving seats on the triangular first lateral sides of the inner support frame while the at least a first coil is provided in the second receiving seats on the triangular second lateral sides of the outer support frame via first circuit boards; and the at least a second magnet is provided in the first receiving seats on the rectangular first lateral sides of the inner support frame while the at least a second coil is provided in the second receiving seats on the rectangular second lateral sides of the outer support frame via second circuit boards.

7. The optical system of claim 5, wherein the anti-shake device further comprises:

a shake detection module provided on the optical lens module and configured to detect a shake amount of the optical lens module;

a position detection module provided on the driving module and configured to detect amounts by which the biaxial rotating element is pivoted about the first axis and the second axis;

an optical path adjusting element provided on the flat surface of the inner plate portion of the biaxial rotating element and configured to adjust a direction of light coming from the optical lens module so that the light is projected toward the image capture module; and a control module connected to the shake detection module, the position detection module, and the driving module and configured to control the driving module according to the shake amount of the optical lens module, detected by the shake detection module, and the amounts by which the biaxial rotating element is pivoted, detected by the position detection module, so that the driving module pivots the biaxial rotating element and thereby compensates for an unstable state of the optical path that is caused by shaking of the optical lens module.

8. The optical system of claim 7, wherein the position detection module comprises a first magnetism sensing element centrally provided in each said first coil and corresponding in position to the first magnet corresponding to each said first coil, and a second magnetism sensing element centrally provided in each said second coil and corresponding in position to the second magnet corresponding to each said second coil, the first and the second magnetism sensing elements being configured to detect variation of magnetic lines so as for the control module to calculate the amounts by which the biaxial rotating element is pivoted; and wherein the optical path adjusting element is one of a wedge-shaped prism provided on the flat surface of the inner plate portion and a reflective layer provided on the flat surface of the inner plate portion.

* * * * *